Aug. 25, 1925.
C. A. BUTCHER
1,551,286
RELAY PROTECTIVE SYSTEM
Filed Dec. 2, 1922
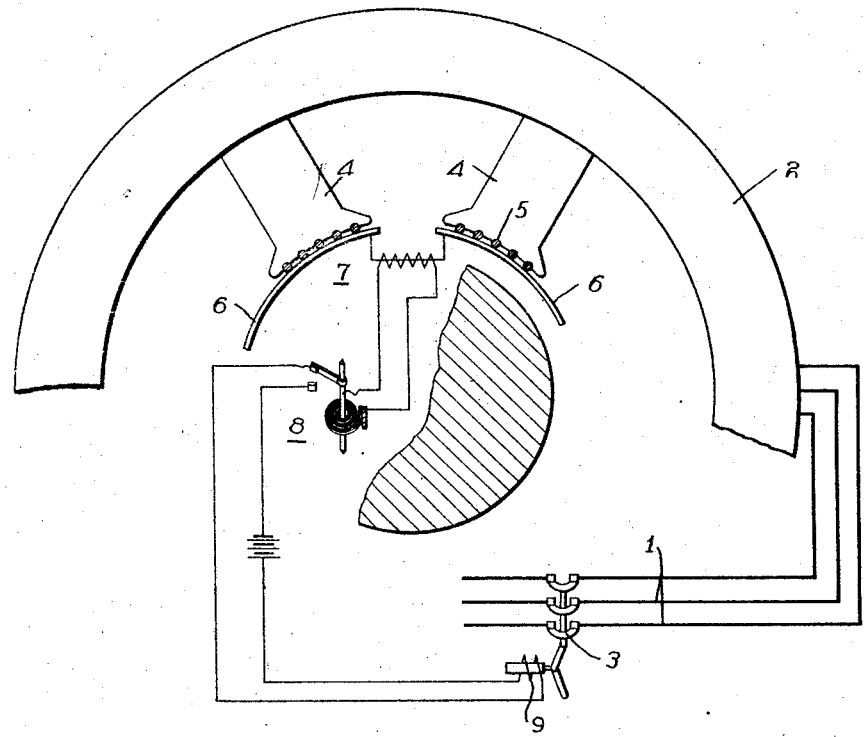
WITNESSES:
INVENTOR
Charles A. Butcher
BY
ATTORNEY Patented Aug. 25, 1925.

1,551,286

UNITED STATES PATENT OFFICE.

CHARLES A. BUTCHER, OF EAST PITTSBURGH, PENNSYLVANIA, ASSIGNOR TO WESTINGHOUSE ELECTRIC & MANUFACTURING COMPANY, A CORPORATION OF PENNSYLVANIA.

RELAY PROTECTIVE SYSTEM.

Application filed December 2, 1922. Serial No. 604,534.

*To all whom it may concern:*

Be it known that I, CHARLES A. BUTCHER, a citizen of the United States, and a resident of East Pittsburgh, in the county of Allegheny and State of Pennsylvania, have invented a new and useful Improvement in Relay Protective Systems, of which the following is a specification.

My invention relates to relay protective systems and particularly to systems for protecting rotating apparatus provided with amortisseur or damping windings.

One object of my invention is to detect abnormal operation of a synchronous machine by measuring the current traversing the damping windings.

Another object of my invention is to provide a simple system, of the above-indicated character, whereby such abnormal operation may be readily and easily detected.

My invention has its immediate application in the protection of synchronous converters, the stationary pole-magnet members of which are provided with damping or amortisseur windings. The ordinary method of starting and accelerating a synchronous machine consists in applying a reduced electromotive force until the rotating element attains substantially synchronous speed and in then applying the normal operating potential of the applied circuit.

In stations where the transfer is effected automatically by control apparatus provided for that purpose, it is desirable that some means be provided for detecting an abnormal condition that prevents the starting of the synchronous machine, such as frozen bearings or insufficient starting voltage. Under such circumstances, the damping windings would constitute a short-circuited secondary of the transformer and would soon become heated to a dangerous temperature.

In order to detect that condition, I provide a current transformer in circuit with the damping windings and a relay to measure the current traversing the windings and the time interval of such traversal to determine the abnormal condition of operation of the synchronous machine. When such interval exceeds the time interval that is known to be sufficient to permit the acceleration of the machine to synchronous speed, the relay becomes effective to disconnect the machine or otherwise control it as desired.

The single figure of the accompanying drawing is a diagrammatic view, partially in elevation, of an electrical system containing a synchronous machine that is provided with a protective arrangement in accordance with my invention.

As is illustrated in the drawing, energy is derived from a source 1 of electromotive force and supplied to the windings of a synchronous machine 2 through a circuit interrupter 3. The machine 2 comprises a plurality of stationary field-magnet pole members 4 which have damping windings disposed at the surfaces of the pole members adjacent to the armature. The damping windings comprise a plurality of conducting members 5 that extend laterally across the surface of the pole member and connecting bars 6 of conducting material that join the ends of the cross bars 5.

In circuit with the connecting bars 6, I dispose a current transformer 7, the secondary winding of which is connected to an inverse time element relay 8 which may be arranged to have such time element in its operation as will suffice to protect the damping windings from damage caused by overheating.

The relay 8, when energized to the predetermined degree for which it is adjusted, cause the energization of a trip coil 9 to open the interrupter 3.

I have not illustrated the starting and running switches whereby starting and normal operating potential may be applied to the synchronous machine 2, since they are well known in the art and do not enter into my invention.

According to my invention, it is merely necessary to measure the interval of time during which current traverses the windings either by reason of the armature failing to start or by reason of the machine being pulled out of step after an excessive load has been placed thereon. In the first instance, the non-starting of the machine may be caused by a frozen bearing, by an open circuit in any of the connecting means, thereby causing single-phase operation, or by reason of the starting voltage being insufficient. In the second instance, the load upon the machine may be such as to pull it out of synchronism, and, in that case, the relay will measure the current traversing the winding while there is relative movement between the armature and the field members.

When the current traverses the winding for an interval of time exceeding that normally required to accelerate the machine to synchronous speed, the relay operates to disconnect it from the system before it may overheat. Normally, the relay is not energized long enough to become effective.

My invention is not limited to any specific disposition or arrangement of the thermally-responsive element but comprehends all means whereby the temperature and current effects upon the damping windings may be measured and utilized to protect the apparatus when operating abnormally.

I claim as my invention:

1. The combination with a rotating electrical translating apparatus provided with amortisseur windings, of means for protecting the apparatus from overheating by reason of abnormal conditions therein, comprising means responsive to the interval of time that current traverses said amortisseur windings.

2. The combination with a rotating electrical translating apparatus provided with amortisseur windings, of means for protecting the apparatus from overheating by reason of abnormal conditions therein comprising means responsive under predetermined conditions to the current traversing said windings.

3. The combination with a rotating electrical translating apparatus provided with amortisseur windings, of means for indicating abnormal relative movement between the respective parts of the apparatus when energized, comprising means responsive to the current traversing the amortisseur windings.

4. The combination with a synchronous machine provided with amortisseur windings, of a retarded device responsive to the current traversing a portion of said windings for controlling the energization of the machine.

5. In an electric circuit, the combination with a synchronous machine provided with amortisseur windings and means for connecting the machine to the circuit, of means for controlling the connecting means in accordance with a non-synchronous operation of the machine comprising means responsive to the current traversing the amortisseur windings.

6. In an electric circuit, the combination with a synchronous machine provided with amortisseur windings and means for connecting the machine to the circuit, of means for controlling the connecting means in accordance with a non-synchronous operation of the machine comprising means responsive to the time during which current traverses the amortisseur windings.

7. In an electric circuit, the combination with an electric apparatus embodying relatively movable members, one of which is provided with amortisseur windings, of a electro-responsive device connected to said windings to be influenced by the current traversing said windings and means controlled by said device for controlling the energization of the apparatus from the circuit.

8. In an electric circuit, the combination with an electric apparatus embodying relatively movable members that are adapted to move relatively to each other at the synchronous speed of the applied electromotive force when the apparatus is properly energized and operating, and one member of which is provided with amortisseur windings, of means for detecting a non-synchronous operating condition comprising means responsive to the interval of time during which current traverses the amortisseur windings by reason of non-synchronous operation.

9. The method of detecting a condition of non-synchronous operation of a synchronous machine provided with amortisseur windings which comprises measuring the current caused to traverse said windings.

10. The method of detecting a condition of non-synchronous operation of a synchronous machine provided with amortisseur windings which comprises measuring the interval of time during which current is induced in said windings.

11. In an electric circuit, the combination with a synchronous converter provided with amortisseur windings disposed at the surface of the pole magnet members, of a current transformer disposed in the circuit of a conductor of said windings and an electro-responsive device energized therefrom.

12. In an electric circuit, the combination with an electric apparatus embodying relatively movable members that are adapted to move relatively to each other at the synchronous speed of the applied electromotive force when the apparatus is properly energized and operating, and one member of which is provided with amortisseur windings, of means for detecting a non-synchronous operating condition comprising means responsive to a predetermined condition of the amortisseur windings.

13. In combination, a synchronous machine having an amortisseur winding, a retarded relay responsive to the current in said winding, and means including said relay for disconnecting said machine from the circuit under certain conditions.

14. In combination, a dynamo-electric machine having an amortisseur winding, a relay operatively connected to said winding to be energized in accordance with the heating thereof, and means controlled by said relay for preventing excessive heating of said winding.

In testimony whereof, I have hereunto subscribed my name this 13th day of November 1922.

CHARLES A. BUTCHER.